United States Patent [19]
Zizzi

[11] Patent Number: 5,902,081
[45] Date of Patent: May 11, 1999

[54] SYSTEM FOR LOCKING A SKI-BASED VEHICLE TO A PLATFORM

[75] Inventor: Blake Zizzi, Cos Cob, Conn.

[73] Assignee: Invento Enterprises, LLC, Stamford, Conn.

[21] Appl. No.: 08/708,395

[22] Filed: Sep. 4, 1996

[51] Int. Cl.⁶ .................................................. B60P 7/08
[52] U.S. Cl. ........................................ 410/3; 410/2; 410/7
[58] Field of Search .................. 410/2–4, 7, 9, 410/19, 77; 248/500

[56] References Cited

U.S. PATENT DOCUMENTS

| | | |
|---|---|---|
| 1,495,442 | 5/1924 | Rosencrans . |
| 1,708,231 | 4/1929 | Moore et al. ............................. 410/9 |
| 1,751,512 | 3/1930 | Friedlaender ........................... 410/7 |
| 3,730,552 | 5/1973 | Clark . |
| 3,923,335 | 12/1975 | Erickson . |
| 3,955,847 | 5/1976 | Schiowitz ............................. 410/19 X |
| 4,143,799 | 3/1979 | Dietlein et al. . |
| 4,312,467 | 1/1982 | Kulwin . |
| 4,671,713 | 6/1987 | Lenkman ................................. 410/7 |
| 4,717,055 | 1/1988 | San Juan . |
| 4,948,311 | 8/1990 | St. Fierre et al. ..................... 410/107 |
| 5,044,845 | 9/1991 | Baker, Jr. .................................. 410/3 |
| 5,203,655 | 4/1993 | Persau ........................................ 410/3 |
| 5,387,070 | 2/1995 | Roeling ................................. 410/3 X |
| 5,593,259 | 1/1997 | Kuo ............................................. 410/3 |
| 5,607,270 | 3/1997 | Zimmerman ......................... 410/7 X |
| 5,716,175 | 2/1998 | Fenske et al. ............................. 410/3 |

FOREIGN PATENT DOCUMENTS

| | | | |
|---|---|---|---|
| 1151531 | 1/1958 | France ........................................ 410/3 |

*Primary Examiner*—Stephen T. Gordon
*Attorney, Agent, or Firm*—Ohlandt, Greeley, Ruggiero & Perle

[57] ABSTRACT

There is provided a system for locking skis of a snowmobile to the upper surface of a platform. The system includes a stationary shaft having a lower portion secured to the platform and an upper portion for supporting an adjustment nut and a crank handle that rotate about the upper portion. The upper portion of the stationary shaft has multistart or multilead threads at its outer surface. Also, a lock bar is situated below the adjustment nut so that it may be adjusted between a first position where the lock bar holds the skis against the platform and a second position where the lock bar releases the skis. In particular, the adjustment assembly changes its vertical position when rotated about the upper portion of the shaft and, thus, is capable of adjusting the vertical position of the lock bar as well.

7 Claims, 7 Drawing Sheets

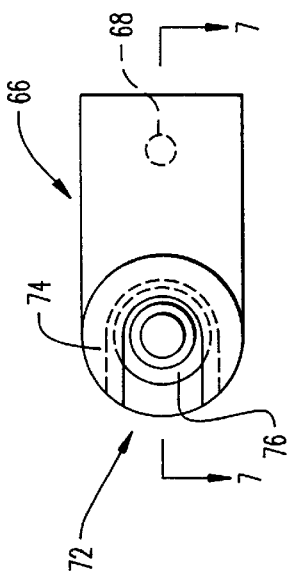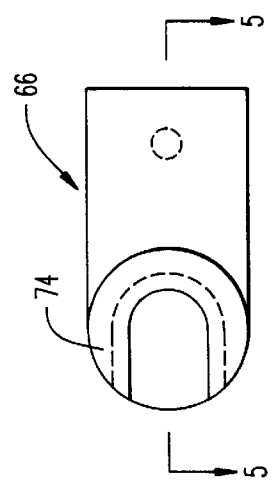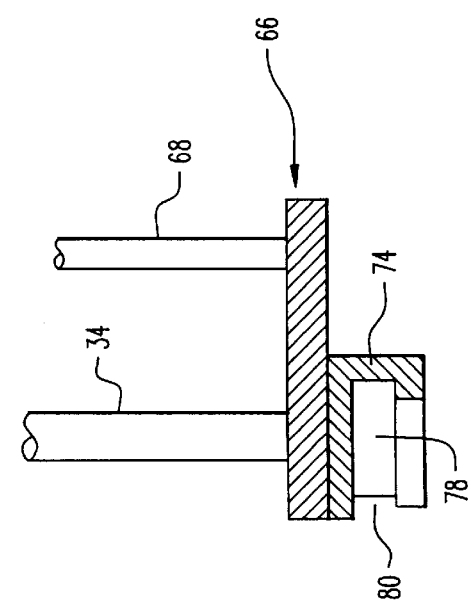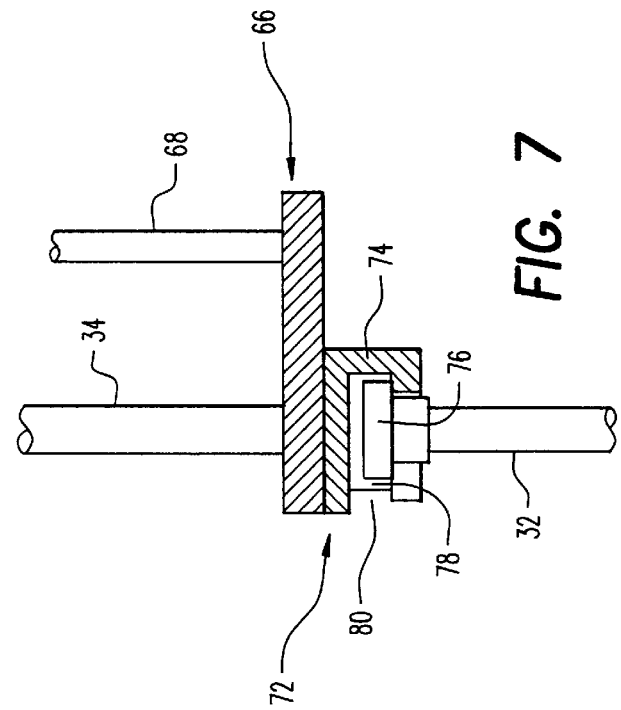

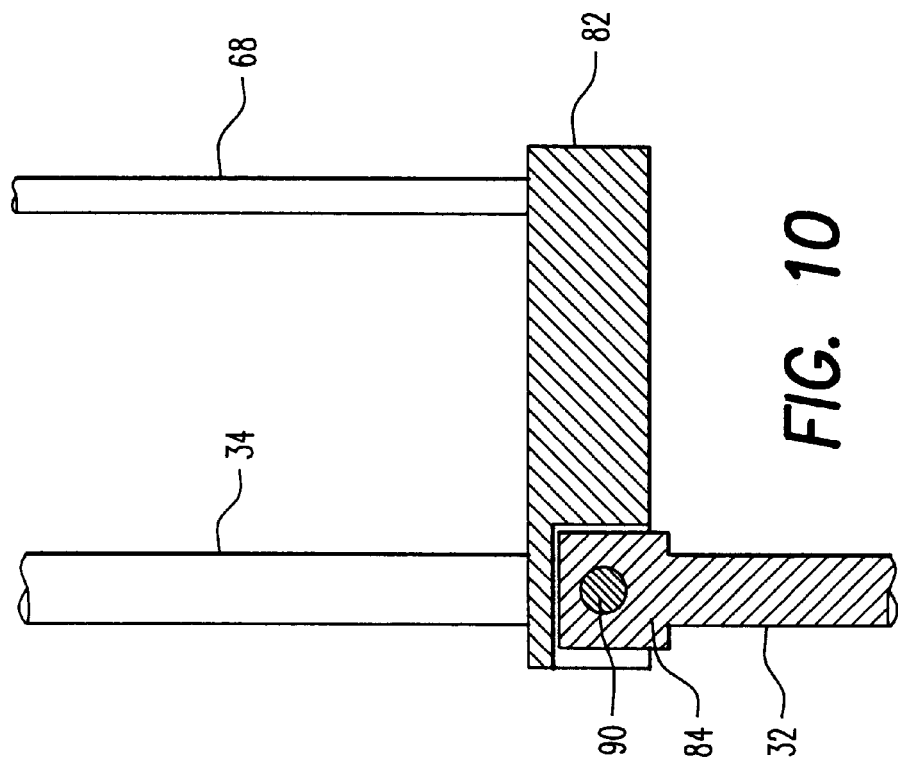
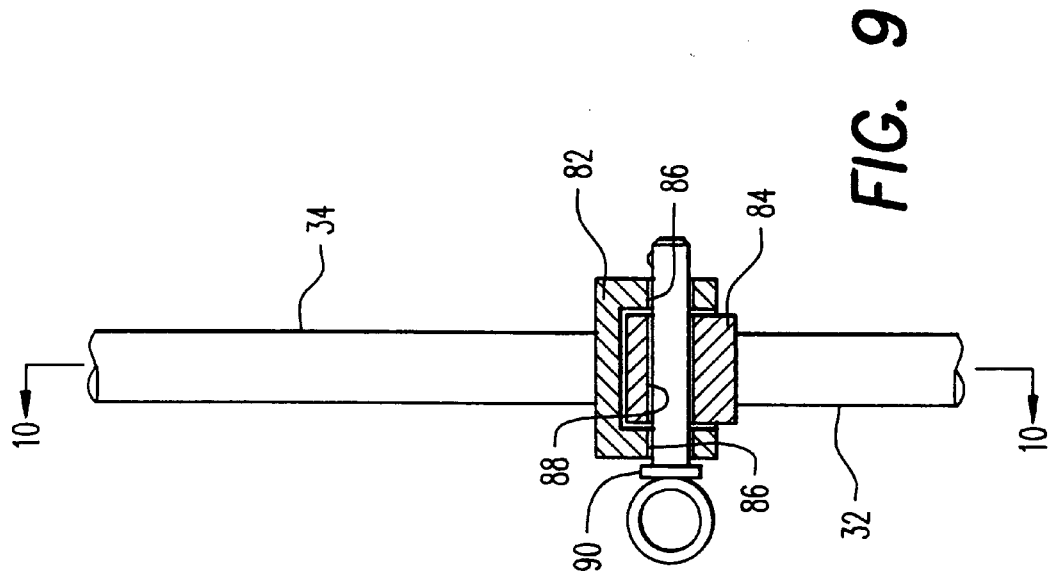

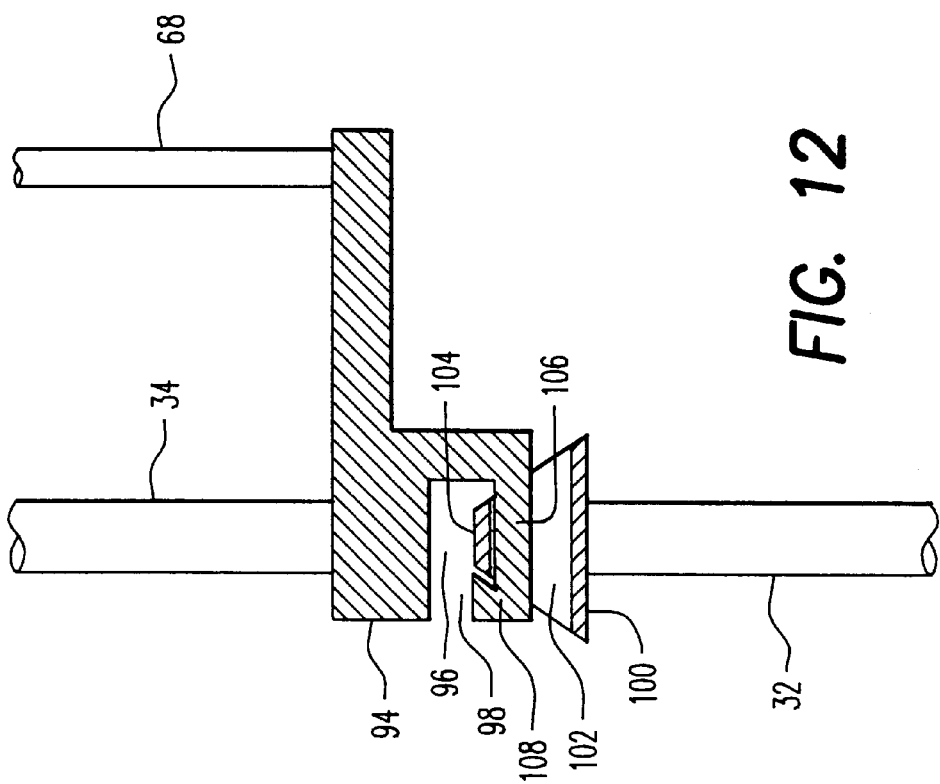
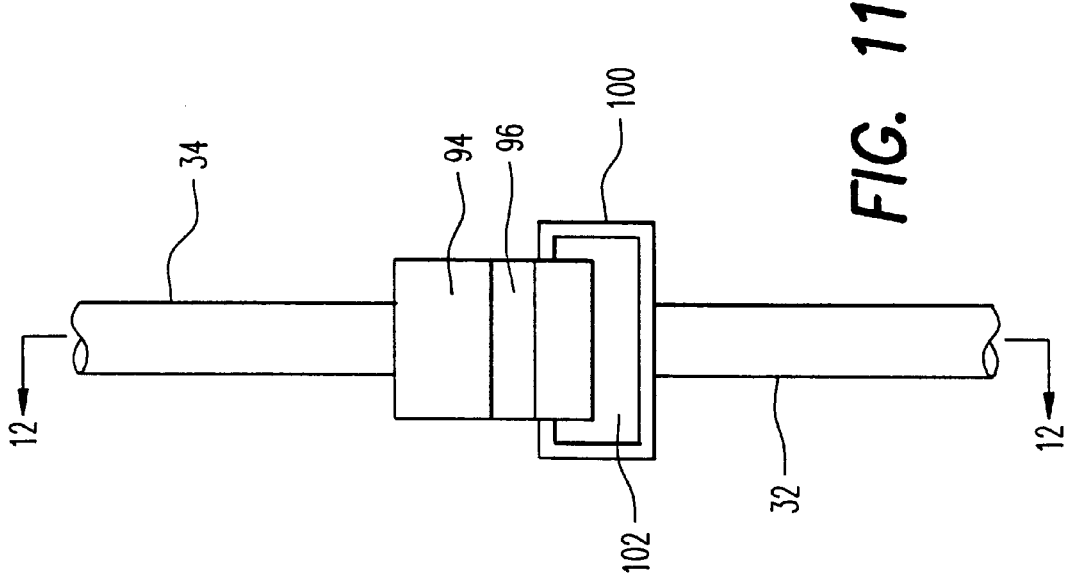

SYSTEM FOR LOCKING A SKI-BASED VEHICLE TO A PLATFORM

BACKGROUND OF THE INVENTION

I. Field of the Invention

The present invention relates generally to systems for supporting skis, ski mobiles and the like on mobile platforms. More particularly, the present invention relates to an adjustable, quick-acting locking mechanism for securely maintaining skis, particularly the skis of a snowmobile or other ski-based vehicle, against a surface, such as the upper surface of a trailer bed. The present invention is a mechanism for securely clamping skis to the upper surface that is easy to use, simple to install and disassemble, and provides a swift actuator for quick locking and unlocking of the skis from the upper surface.

II. Description of the Prior Art

Skis, such as snow skis or water skis, are generally used on snow or water surfaces and are transported over dry land by a supporting mechanism, such as a ski rack. Conventional ski racks attach to the roof, trunk or bumper of an automobile and support the skis during transit. Examples of such ski racks are provided in U.S. Pat. No. 4,143,799 to R. W. Dietlein, et al., which issued on Mar. 13, 1979, titled SKI RACK FOR VEHICLES; U.S. Pat. No. 4,312,467 to R. Kulwin, which issued on Jan. 26, 1982, titled DOUBLE TIER AUTOMOTIVE SKI RACK; and U.S. Pat. No. 4,717,055 to A. San Juan, which issued on Jan. 5, 1988, titled BRACKET FOR TRUNK MOUNTING SKI OR SURFBOARD RACK. However, these conventional ski racks are complicated mechanisms that require much time and effort to secure and remove the skis. Likewise, attachment and detachment of the ski rack to and from the automobile are also time consuming and difficult.

Similarly, ski-based vehicles, such as snowmobiles and jet skis, are also transported over dry land. These ski-based vehicles are transported by a mobile platforms, such as a trailer bed, that includes a locking mechanism to anchor the vehicle to the platform during transit and/or to prevent theft of the vehicle. For example, U.S. Pat. No. 3,730,552 to R. C. Clark, which issued on May 1, 1973, titled LOAD ANCHORING DEVICE provides an anchoring device for supporting a snowmobile on the upper deck of a trailer. The anchoring device is an elongated plate having one end hinged to the upper deck and the other end attached to the back of the snowmobile.

Also, U.S. Pat. No. 3,923,335 to J. A. Erickson, which issued on Dec. 2, 1975, titled CAMPER UNIT FOR SNOWMOBILE TRAILERS and U.S. Pat. No. 5,387,070 to J. E. Roeling, which issued on Feb. 7, 1995, titled COUPLING SYSTEM FOR MOTORIZED VEHICLES each provide a mobile platform having an upper deck for supporting snowmobiles. The skis of the snowmobiles include a large loop at their front ends, and each mobile platform includes a rod that passes through the loop of the skis to retain the front end of the skis on the platform.

The mechanisms described in the above cited patents do not safely retain the skis of the snowmobile to the platform. Snowmobiles are large, heavy vehicles that require substantial support and security when moved. The mechanisms of the above patents rely on the weight of the snowmobiles to retain them on the platform. However, the snowmobiles' skis are not securely held against the platform and, therefore, snowmobiles are subject to violent movement during transport. Accordingly, such insecure movement of the snowmobile is dangerous and can cause damage to the snowmobile and/or the mobile platform.

Mechanisms for securely holding skis to the upper surface of a mobile platform are known. For example, U.S. Pat. No. 5,044,845 to V. J. Baker, Jr., which issued on Sep. 3, 1991, titled SNOWMOBILE TRANSPORT APPARATUS provides a locking mechanism for maintaining the skis of a snowmobile against the upper deck of a trailer. Specifically, a pair of forward slots and a corresponding pair of rear slots are formed through the mobile platform. Hook members are projected through the rear slots, and actuator handles are directed through the forward slots. To secure the snowmobile's skis to the mobile platform, a latch rod is positioned over and held against the skis by the hook members when activated by the actuator handles. However, this locking mechanism is complicated and require much time and effort to secure and remove the skis. In addition, attachment and detachment of the locking mechanism to and from the mobile platform are also time consuming and difficult.

In view of the above patents, it is apparent that mechanisms for providing a secure hold of skis against the upper surface of a mobile platform tend to be complicated and difficult to use. Analogously, the complicated design of such mechanisms are expensive to install and manufacture.

One mechanism that provides a secure hold is a mechanism that includes a lock bar placed over the skis and a clamping device situated through a middle aperture of the lock bar that clamps the lock bar downward against the skis. For example, U.S. Pat. No. 5,203,655 to D. Persau, which issued on Apr. 20, 1993, titled LOCKING BAR FOR SNOWMOBILE ON TRAILER provides a lock bar and a clamping device having a threaded shaft that passes through an aperture of the lock bar and screws into a receiving hole formed at the upper surface of a mobile platform. By rotating the entire clamping device, including its threaded shaft, the lock bar is clamped downward against the skis of a snowmobile.

However, the clamping device of U.S. Pat. No. 5,203,655 is cumbersome and awkward to use. In particular, the threaded shaft of the clamping device must be alignment with the receiving hole of the platform. This is difficult to accomplish since the lock bar obstructs the users view of the receiving hole. Also, the clamping device is unwieldy to use since the threaded shaft rotates with its respective handle and the only stationary structure for supporting the device is the receiving hole of the platform. In addition, the thread of the shaft has a progressive slope so that the lower portion of the clamping device will be securely maintained against the platform. However, due to this progressive slope, the shaft requires numerous turns in order to adjust vertically relative to the platform. Furthermore, the clamping device is difficult to remove from the platform since it must be completely unscrewed from the receiving hole. This removal process is particularly time consuming since, as stated above, the thread of the shaft has a progressive slope.

The present invention is particularly well suited for locking or otherwise supporting individual skis or a ski-based vehicle to the upper surface of a mobile platform, such as a trailer bed. In particular, the present invention is a system for locking one or more skis against an upper surface of a platform that includes a stationary shaft having a lower end that is secured to the platform and an adjustment assembly that easily mounts at the upper end for rotation about the stationary shaft. Accordingly, the stationary shaft provides solid support for the adjustment assembly and, thus, the adjustment assembly easily rotates about the shaft. In addition, the upper portion of the shaft has multistart or multilead threads that provide a quick-acting mechanism for locking and unlocking the skis to the platform, while the lower portion is securely maintained against the platform. Furthermore, a unique connection is provided between the upper and lower portions so that the adjustment assembly may be quickly and easily attached to and separated from the platform.

SUMMARY OF THE INVENTION

Against the foregoing background, it is a primary object of the present invention to provide an easy-to-use locking mechanism for securely holding skis, particularly those of a snowmobile or jetski, against the upper surface of a mobile platform.

It is another object of the present invention to provide such a locking mechanism that provides for quick locking of the skis in place and, likewise, quick release of the skis from its secure hold.

It is a further object of the present invention to provide such a locking mechanism that may be quickly and easily separated from the upper surface of the mobile platform.

It is a still further object of the present invention to provide such a locking mechanism that includes a quick adjustment to accommodate skis of different height and additional security when used with a padlock.

To accomplish the foregoing objects and advantages, the present invention is a system for locking at least one ski against a platform which, in brief summary, comprises a stationary shaft that includes an end portion that is secured to the platform, and an adjustment assembly that is disposed for rotation about the stationary shaft. The adjustment assembly effectively changes its axial position when rotated about the stationary shaft. Also, means for holding the at least one ski against the platform is disposed adjacent to the adjustment assembly. The adjustment assembly has a first position for securing the at least one ski between the holding means and the platform, and a second position for releasing the least one ski from between the holding means and the platform.

More specifically, the present invention comprises a lower shaft that is secured to the platform and an upper shaft that is coupled to the lower shaft and supported above the platform. The adjustment assembly is disposed for rotation about the upper shaft and effectively changes its axial position when rotated about the upper shaft.

BRIEF DESCRIPTION OF THE DRAWINGS

The foregoing and still further objects and advantages of the present invention will be more apparent from the following detailed explanation of the preferred embodiments of the invention in connection with the accompanying drawings:

FIG. 4 is a top view of the foot of FIG. 3;

FIG. 5 is a sectional view of the foot taken along line 5—5 of FIG. 4;

FIG. 6 is a top view of the anchor and foot of FIG. 3 in which the anchor is concealed by the foot;

FIG. 7 is a sectional view of the anchor and foot taken along line 7—7 of FIG. 6;

FIG. 9 is a sectional view of the anchor and foot taken along line 9—9 of FIG. 8;

FIG. 10 is a sectional view of the anchor and foot taken along line 10—10 of FIG. 9;

FIG. 11 is a side elevational view of a third anchor and foot arrangement; and

FIG. 12 is a sectional view, taken along line 12—12 of FIG. 11, of the anchor and foot.

DETAILED DESCRIPTION OF THE PREFERRED EMBODIMENTS

Figure 1:
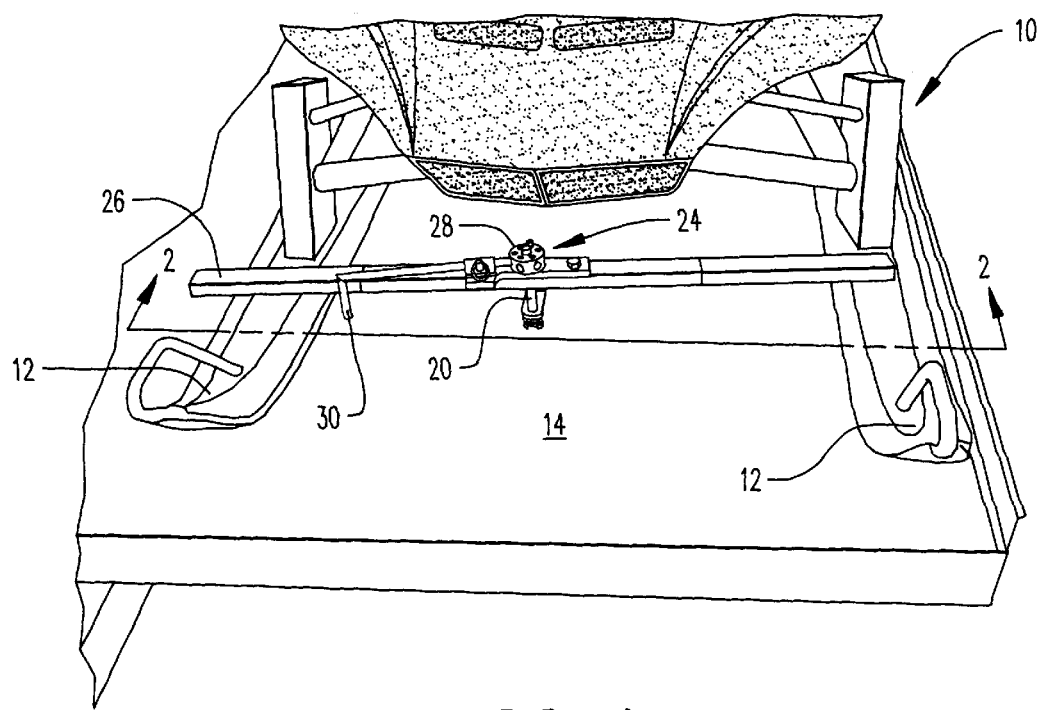
FIG. 1 is a perspective view of a first preferred embodiment of the present invention.

Referring to the drawings and, in particular, to FIG. 1, there is provided a system of the preferred embodiment which is generally represented by reference numeral 10. As shown in FIG. 1, the system 10 is used to lock one or more skis 12 against an upper surface of a mobile platform 14. The system 10 comprises a stationary shaft 20 having a lower shaft 32 (shown in FIG. 2) secured to the platform 14 and an upper shaft 34 supported above the lower shaft, an adjustment assembly 24 disposed about an upper portion of the stationary shaft, and a structure adapted to be positioned over the skis 12.

For the preferred embodiment, the structure is a lock bar 26 that is typically provided by the vendor of the mobile platform 14. The lock bar 26 includes a middle aperture (not shown) for receiving the stationary shaft 20. In operation, the adjustment assembly 24 presses the lock bar 26 downward against the skis 12 and clamps the skis between the lock bar and the upper surface of the platform 14.

Figure 2:
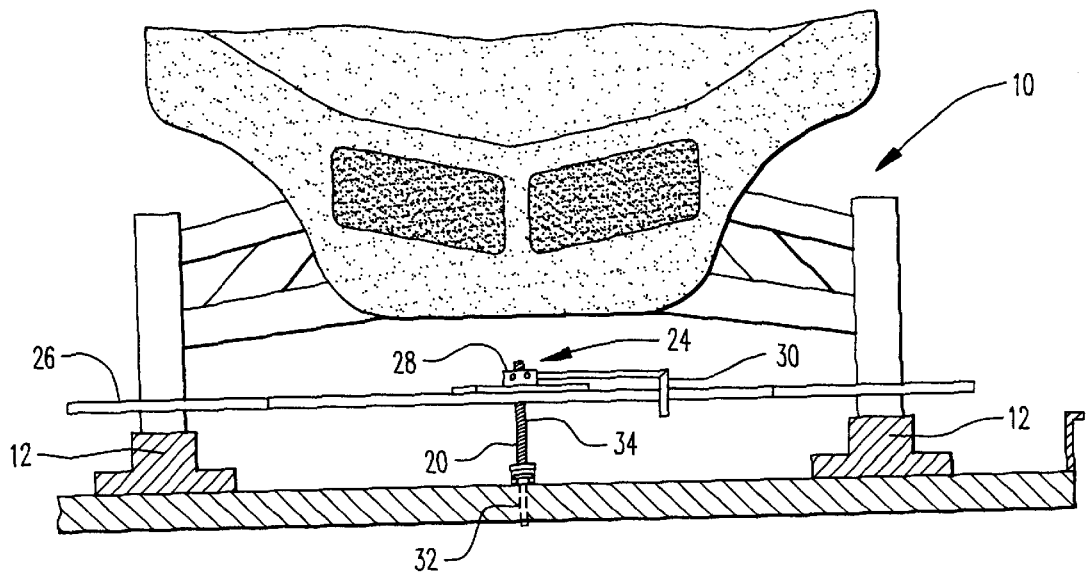
FIG. 2 is a cutaway view of the first preferred embodiment taken along line 2—2 of FIG. 1.

Referring to FIGS. 1 and 2, the adjustment assembly 24 includes an adjustment nut 28 adapted to be positioned on the stationary shaft 20, and a crank handle 30. The adjustment nut 28 is rotatable about the stationary shaft 20. The crank handle 30 is adapted to rotate the adjustment nut. By rotating the adjustment nut 28 about the stationary shaft 20, the adjustment assembly 24 changes its axial position, upward or downward, relative to the stationary shaft. Specifically, for the preferred embodiment, the adjustment nut 28 axially descends by rotating it about the stationary shaft 20 in a clockwise direction (when viewed from above), and the adjustment nut axially ascends when rotated in a counter-clockwise direction. Downward pressure is applied to the lock bar 26 when the adjustment nut 28 is adjusted downward, and downward pressure is relieved from the lock bar when the adjustment nut is adjusted upward. Thus, by rotating the adjustment nut 28, preferably by using the crank handle 30, the skis 12 are clamped against or unclamped from the upper surface of the platform 14. For the preferred embodiment, the adjustment assembly 24 has a first position for securing the skis 12 between the lock bar 26 and the upper surface of the platform 14, as shown in FIG. 1, and a second position for releasing the skis from between the lock bar and the upper surface of the platform, as shown in FIG. 2.

Figure 3:
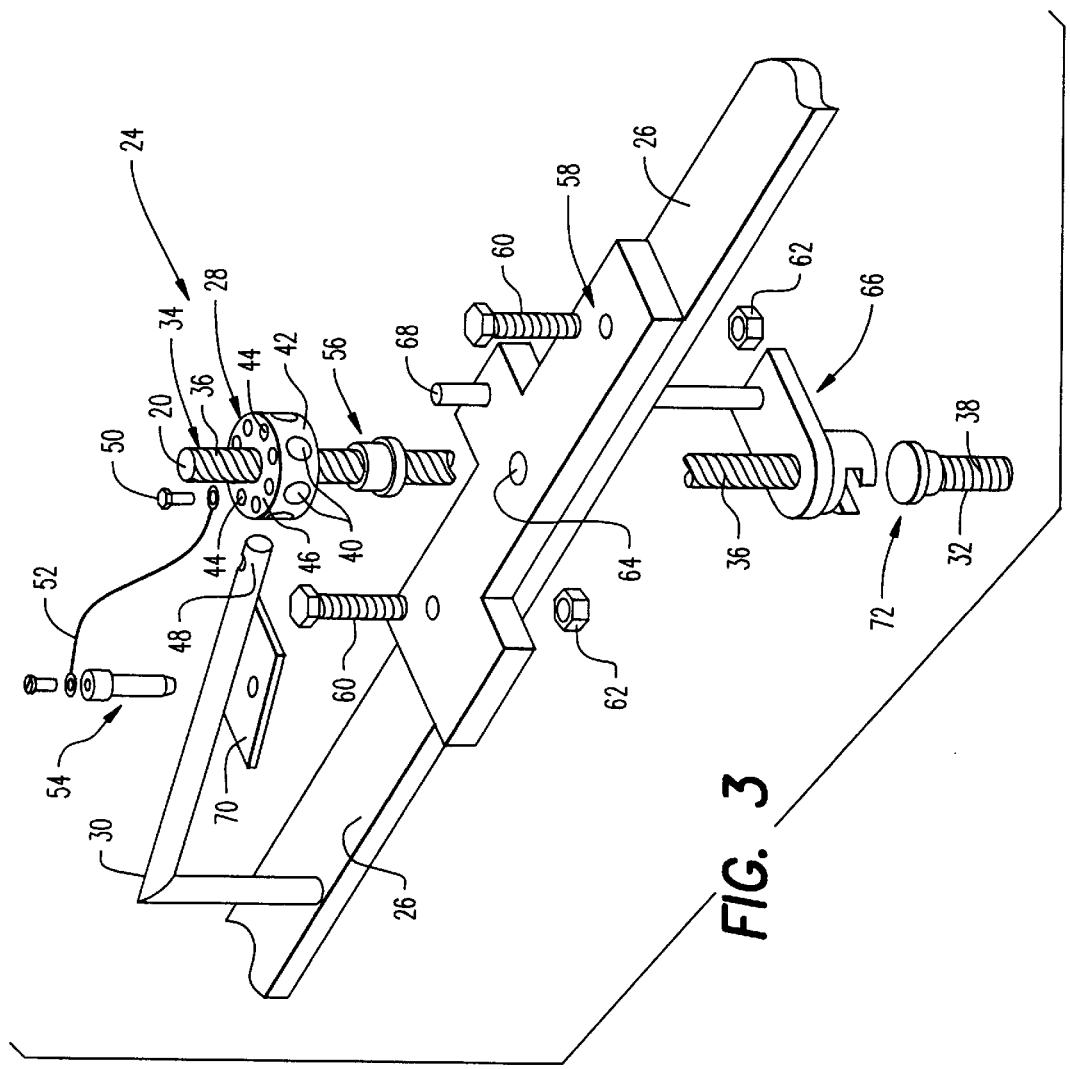
FIG. 3 is an exploded view of the first preferred embodiment of FIG. 1.

Referring FIGS. 2 and 3, the stationary shaft 20 includes a lower shaft 32 that is secured to the platform 14 and an upper shaft 34 that supports the adjustment assembly 24. As shown in FIG. 3, the upper threads 36 at the outer cylindrical surface of the upper shaft 34 are multistart or multilead threads whereas the lower thread 38 at the outer cylindrical surface of the lower shaft 32 has a standard thread. For the preferred embodiment, the upper threads 36 include eight threads formed about the upper shaft 34 so that they extend an axial distance of about ½ of an inch to about 1 inch for every rotation of each thread. Also, the lower thread 38 of the lower shaft 32 provides a secure connection to the platform 14.

It is important to note that the multistart or multilead threads of the upper shaft 34 provide for the quick-acting feature of the present invention. The structure of these upper threads 36 provides the adjustment nut 28 with the capability of significant axial adjustment when rotated about the upper portion 34. Accordingly, a slight turn of the adjustment assembly 24 causes significant vertical adjustment of the adjustment nut 28, thus permitting a user to quickly lock and unlock the skis 12 to the platform 14 (shown in FIGS. 1 and 2) with ease.

As shown in FIG. 3, the adjustment nut 28 includes a plurality of handle receiving apertures 40 formed at its outer cylindrical surface 42 and plurality of corresponding bolt receiving apertures 44 formed at its top planar surface 46. A distal end 48 of the crank handle 30 may be inserted into any one of the handle receiving apertures 40 and held in place by a detent pin 50 that is inserted into the respective bolt receiving aperture 44. The detent pin 50 is also used to hold a retainer line 52 of a corresponding retainer pin 54 so that the retainer pin is not separated and lost. Although not shown, the retainer pin 54 may be replaced with a padlock or other securing means. The adjustment assembly 24 also includes a lifting nut 56 that attaches to the bottom surface and inner bore of the adjustment nut 28. The adjustment nut has an inner groove (not shown) for receiving the upper threads 36, namely the multistart or multilead threads, at the outer cylindrical surface of the upper shaft 34 and, thus, works in conjunction with the upper shaft to provide the fast lifting feature of the present invention. In addition, the lifting nut provides a bearing between the adjustment nut and the lock bar.

The present invention also includes anti-rotation element and a locking element. Both the anti-rotation and locking elements require a top plate 58 that is attached to the lock bar 26 by fasteners, such as fastening bolts 60 and nuts 62 shown in FIG. 3. The anti-rotation element prevents a foot element 66 from rotating by using the top plate 58 attached to the lock bar 26 as an anchor. The locking element prevents the adjustment assembly 24 from rotating about the upper shaft 34. The top plate 58 includes a central aperture 64 for permitting the stationary shaft 20, particularly the upper shaft 34, to pass therethrough. For the anti-rotation element, the foot element 66 is attached to the upper shaft 34 and an anti-rotation pin 68 couples the top plate 58 to the foot element. Thus, the foot element 66 is immobilized relative to the upper shaft 34. Likewise, for the locking element, the crank handle 30 includes a handle plate 70 that is coupled to the top plate 58 by the retainer pin 54 described above.

Figure 3A:
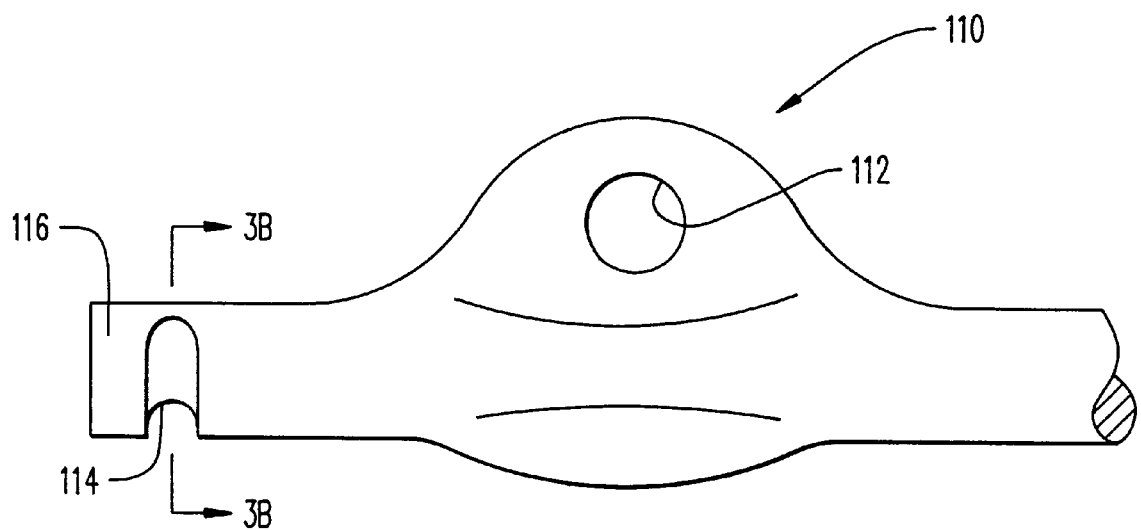
FIG. 3A is a perspective view of an alternative crank handle for the preferred embodiment of FIG. 1.
Figure 3B:
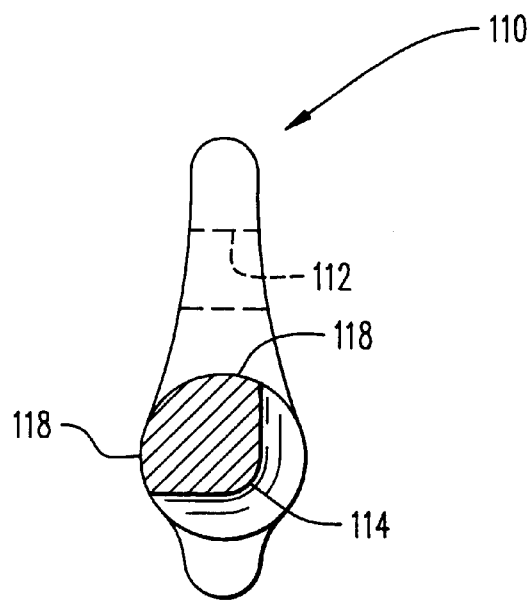
FIG. 3B is a sectional view of the alternative crank handle taken along line 3B—3B of FIG. 3A.

Referring to FIGS. 3A and 3B, there is shown an alternative embodiment of the crank handle. In contrast to the crank handle 30 and handle plate 70 shown in FIG. 3, this alternative crank handle 110 has an integral aperture 112 that serves the same function as the handle plate. In addition, the alternative crank handle 110 includes an annular groove 114 formed at its distal end 116. For the preferred embodiment, shown in FIGS. 1 and 2, a three-quarter turn of the adjustment nut 28 is required to clamp and unclamp the skis. However, the handle at the end of the crank handle 30 may prevent it from rotating more than a one-half turn. Accordingly, the annular groove 114 has two open sides 118 so that the handle of the alternative crank handle 110 may be rotated 90° in order to continue the three-quarter turn. It is to be understood that this particular shape of the annular groove 114 may also be formed at the distal end 48 of the preferred crank handle 30 shown in FIG. 3.

Referring again to FIGS. 2 and 3, coupling means 72 provides for engagement and disengagement of the lower shaft 32 and the upper shaft 34. The coupling means 72 may have a variety of different forms and configurations as illustrated by the three embodiments shown in FIGS. 4 through 12 and described below. Primarily, the coupling means 72 provides for a secure coupling between the upper shaft 34 and the platform 14 when they are attached and, yet, the upper shaft may be separated and re-attached to the platform when desired by the user.

Referring to FIGS. 4 through 7, there is shown a first preferred coupling means 72 for the present invention. Specifically, one portion of the coupling means 72 is a receiving end 74 that is formed at the bottom end of the upper shaft 34, and the other portion of the coupling means 72 is an insertion end 76 formed at the top end of the lower shaft 32. As shown in FIGS. 4 and 5, the receiving end 74 of the first preferred coupling means 72 has an inner chamber 78 with opening 80 on one side. As shown in FIGS. 6 and 7, the insertion end 76 has an outer surface that permits the insertion end to slide through the opening 80 having fit within the inner chamber 78. Also, the lower portion of the inner chamber 78 is formed to the exact shape of the insertion end's outer surface. When the adjustment assembly 24 is at its first position for securing the skis 12 between the lock bar 26 and the upper surface of the platform 14 (as shown in FIG. 1), the lower shaft 32 and the upper shaft 34 are pulled away from each other. Thus, the insertion end 76 fits into the lower portion of the inner chamber 78. At this position, the insertion end 76 interlocks with the receiving end 74. Likewise, to disengage these elements, the adjustment assembly 24 is moved to its second position for releasing the skis 12 from between the lock bar 26 and the upper surface of the platform 14 (as shown in FIG. 2). The insertion end 76 then moves up away from the lower portion of the inner chamber 78 and slides out through the opening 80.

Figure 8:
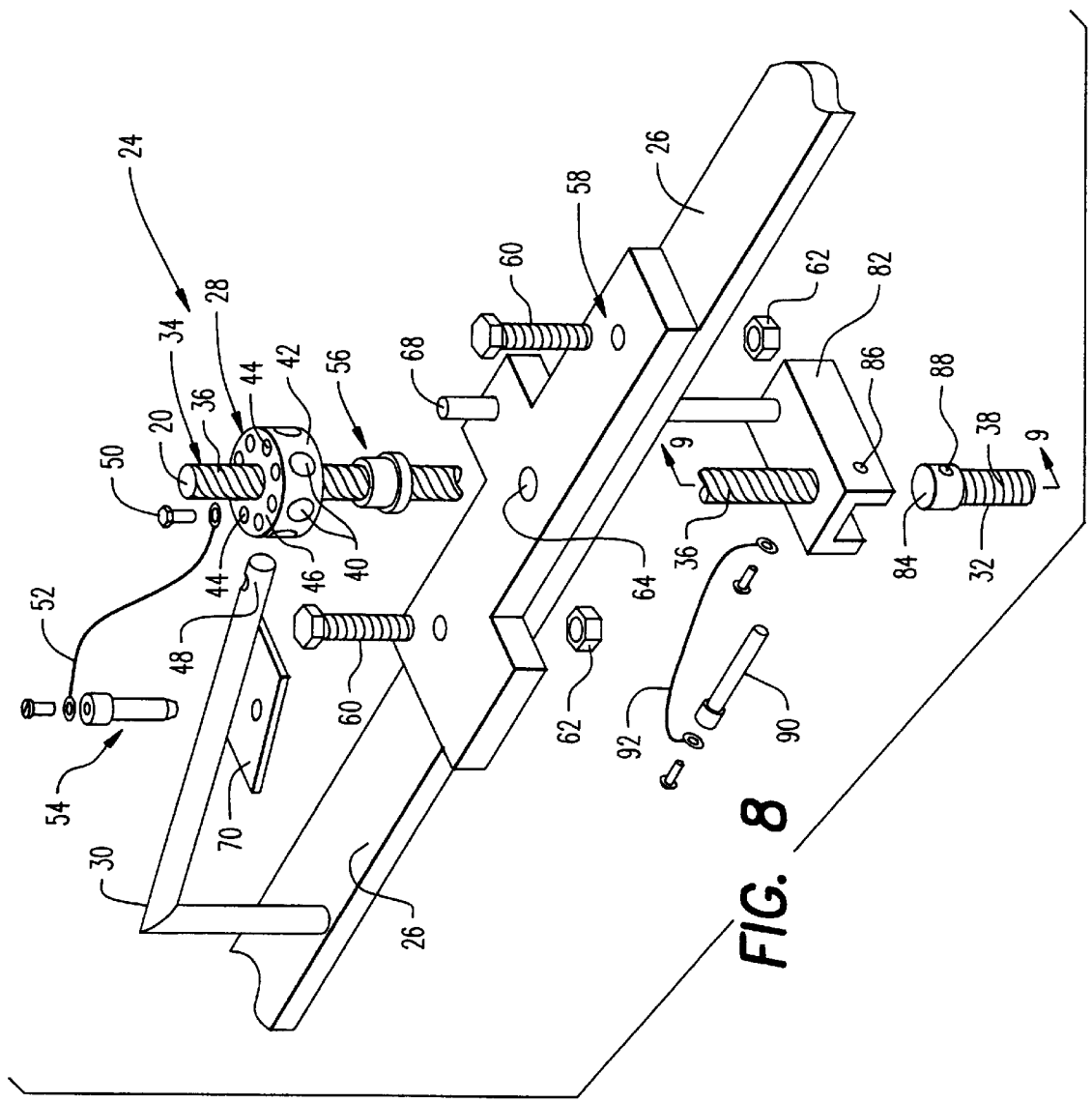
FIG. 8 is an exploded view of a second preferred embodiment of the present invention used with a second an anchor and foot that is different from that of FIG. 1.

Referring to FIG. 8, the preferred embodiment of the present invention is shown with a second preferred coupling means. An enlarged view of the second preferred coupling means is shown in FIGS. 9 and 10. The second preferred coupling means comprises a receiving end or foot 82 positioned at the bottom end of the upper shaft 34 and an insertion end or anchor stud 84 formed at the top end of the lower shaft 32. Both the foot 82 and the anchor stud 84 have pin receiving apertures 86 and 88, respectively. In addition, a lower retainer pin 90 passes through the pin receiving apertures 86 and 88 in order to link the anchor stud 84 to the foot 82, and a lower retainer line 92 connects the lower retainer pin to the foot 82 so that it will not be lost. For this second preferred coupling means, the anchor stud 84 and the foot 82 remain interlocked regardless of the position of the lock bar 26.

Referring to FIGS. 11 and 12, there is shown a third preferred coupling means 72. The third preferred coupling means 72 includes an upper connection 94 having an inner chamber 96 with an opening to one side 98 and a lower connection 100 having a passage 102 formed therethrough. To interlock the lower connection 100 to the upper connection 94, an upper portion 104 of the lower connection is inserted into the inner chamber 96 of the upper connection. Simultaneously, a lower portion 106 of the upper connection 94 is inserted through the passage 102 of the lower connection 100. Then, the upper portion 104 of the lower connection 100 is brought down to the bottom of the inner chamber 96 and behind a lip portion 108 of the upper connection 94. Accordingly, with the adjustment assembly 24 at its first position for holding the skis, the upper shaft 34 and the lower shaft 32 are pulled away from each other, and the upper portion 104 of the lower connection 100 and the lower portion 106 of the upper connection 94 are joined together. Similarly, when the adjustment assembly 24 is moved to its second position for releasing the skis, the upper portion 104 of the lower connection 100 moves away from the bottom of the inner chamber 96 and slides out through the opening 98.

The present invention having been thus described with particular reference to the preferred forms thereof, it will be obvious that various changes and modifications may be made therein without departing from the spirit and scope of the invention as defined in the appended claims.

What is claimed is:

1. A system for locking at least one ski against a platform comprising:
    a stationary shaft having an end portion secured to the platform;
    adjustment means, disposed for rotation about said stationary shaft, for changing axial position when rotated about said stationary shaft, said adjustment means including:
    an adjustment nut for rotation about said stationary shaft,
    a crank handle for rotating said adjustment nut, and
    a lifting nut connected to said adjustment nut and disposed about said stationary shaft, said lifting nut being effective to axially position said adjustment nut when rotated about said stationary shaft; and
    means, disposed adjacent to said adjustment means, for holding said at least one ski against the platform,
    wherein said adjustment means has a first position for securing said at least one ski between said holding means and the platform, and a second position for releasing said at least one ski from between said holding means and the platform.

2. A system for locking at least one ski against a platform comprising:
    a stationary shaft having an end portion fixedly secured to the platform;
    adjustment means, disposed for rotation about said stationary shaft, for changing axial position when rotated about said stationary shaft;
    means, disposed adjacent to said adjustment means, for holding said at least one ski against the platform;
    a foot element connected to said stationary shaft;
    a top plate connected to said holding means; and
    an anti-rotation pin connected to said foot element and said top plate,
    wherein said adjustment means has a first position for securing said at least one ski between said holding means and the platform, and a second position for releasing said at least one ski from between said holding means and the platform.

3. A system for locking at least one ski against a platform comprising:
    a stationary shaft having an end portion fixedly secured to the platform;
    adjustment means, disposed for rotation about said stationary shaft, for changing axial position when rotated about said stationary shaft;
    means, disposed adjacent to said adjustment means, for holding said at least one ski against the platform;
    a top plate connected to said holding means;
    a handle plate connected to said adjustment means; and
    a locking pin connected to said top plate and said handle plate,
    wherein said adjustment means has a first position for securing said at least one ski between said holding means and the platform, and a second position for releasing said at least one ski from between said holding means and the platform.

4. A system for locking at least one ski against an upper surface of a platform comprising:
    a lower shaft secured to the platform and having an insertion end;
    an upper shaft coupled to said lower shaft and being supported above the platform, said upper shaft having a receiving end;
    means for engaging and disengaging said upper shaft and said lower shaft, said means for engaging and disengaging including an engagement pin that passes through said receiving end and said insertion end for interlocking both ends together;
    an adjustment assembly disposed for rotation about said upper shaft, said adjustment assembly being effective to change axial position when rotated about said upper shaft; and
    means, disposed adjacent to said adjustment assembly, for holding said at least one ski against the platform,
    wherein said adjustment assembly has a first position for securing said at least one ski between said holding means and the platform, and a second position for releasing said at least one ski from between said holding means and the platform.

5. A system for locking at least one ski against a platform comprising:
    a lower shaft secured to the platform;
    an upper shaft coupled to said lower shaft and being supported above the platform;
    an adjustment assembly, disposed for rotation about said upper shaft, said adjustment assembly being effective to change axial position when rotated about said upper shaft, said adjustment assembly including:
    an adjustment nut for rotation about said upper shaft,
    a crank handle for rotating said adjustment nut, and
    a lifting nut attached to said adjustment nut and disposed about said upper shaft, said lifting nut being effective to axially position said adjustment nut when rotated about said upper shaft; and
    means, disposed adjacent to said adjustment assembly, for holding said at least one ski against the platform,
    wherein said adjustment assembly has a first position for securing said at least one ski between said holding means and the platform, and a second position for releasing said at least one ski from between said holding means and the platform.

6. A system for locking at least one ski against a platform comprising:
    a lower shaft fixedly secured to the platform;
    an upper shaft coupled to said lower shaft and being supported above the platform;
    an adjustment assembly, disposed for rotation about said upper shaft, said adjustment assembly being effective to change axial position when rotated about said upper shaft;

means, disposed adjacent to said adjustment assembly, for holding said at least one ski against the platform;

a foot element attached to said upper shaft;

a top plate attached to said holding means; and an anti-rotation pin coupled to said foot element and said top plate, wherein said adjustment assembly has a first position for securing said at least one ski between said holding means and the platform, and a second position for releasing said at least one ski from between said holding means and the platform.

7. A system for locking at least one ski against a platform comprising:

a lower shaft fixedly secured to the platform;

an upper shaft coupled to said lower shaft and being supported above the platform;

an adjustment assembly, disposed for rotation about said upper shaft, said adjustment assembly being effective to change axial position when rotated about said upper shaft;

means, disposed adjacent to said adjustment means, for holding said at least one ski against the platform;

a top plate attached to said holding means;

a handle plate attached to said adjustment assembly; and a locking pin coupled to said top plate and said handle plate, wherein said adjustment assembly has a first position for securing said at least one ski between said holding means and the platform, and a second position for releasing said at least one ski from between said holding means and the platform.

* * * * *